United States Patent
Brown et al.

(10) Patent No.: US 7,599,923 B2
(45) Date of Patent: Oct. 6, 2009

(54) ANALYSIS METHOD AND APPARATUS FOR A PARALLEL SYSTEM

(75) Inventors: Douglas P. Brown, Rancho Santa Fe, CA (US); Paul Sinclair, Manhattan Beach, CA (US)

(73) Assignee: Teradata US, Inc., Miamisburg, OH (US)

( * ) Notice: Subject to any disclaimer, the term of this patent is extended or adjusted under 35 U.S.C. 154(b) by 254 days.

(21) Appl. No.: 10/834,515

(22) Filed: Apr. 29, 2004

(65) Prior Publication Data

US 2004/0205062 A1    Oct. 14, 2004

Related U.S. Application Data

(63) Continuation of application No. 09/608,977, filed on Jun. 30, 2000, now Pat. No. 6,738,756.

(51) Int. Cl.
   *G06F 17/30* (2006.01)
(52) U.S. Cl. .................. 707/4; 707/2; 707/3; 707/10
(58) Field of Classification Search .............. 707/2, 707/3, 4, 10, 102; 709/202, 203, 217, 229, 709/204; 703/20; 712/30; 714/4; 715/525, 715/713
   See application file for complete search history.

(56) References Cited

U.S. PATENT DOCUMENTS

| | | | | |
|---|---|---|---|---|
| 5,303,383 | A | * | 4/1994 | Neches et al. .................. 712/43 |
| 5,398,199 | A | * | 3/1995 | Lefons ....................... 708/446 |
| 5,495,578 | A | * | 2/1996 | Rohrbaugh et al. ........... 714/51 |
| 5,606,693 | A | * | 2/1997 | Nilsen et al. .................. 707/10 |
| 5,640,584 | A | * | 6/1997 | Kandasamy et al. .......... 712/30 |
| 5,655,080 | A | * | 8/1997 | Dias et al. .................. 709/202 |
| 5,819,066 | A | * | 10/1998 | Bromberg et al. ........... 707/102 |
| 5,857,192 | A | * | 1/1999 | Fitting ........................ 707/200 |
| 5,864,841 | A | * | 1/1999 | Agrawal et al. ................. 707/2 |
| 5,864,842 | A | * | 1/1999 | Pederson et al. ............... 707/3 |
| 5,872,904 | A | * | 2/1999 | McMillen et al. .............. 714/4 |
| 5,884,299 | A | * | 3/1999 | Ramesh et al. ................. 707/2 |
| 5,940,819 | A | * | 8/1999 | Beavin et al. .................. 707/2 |
| 5,943,545 | A | * | 8/1999 | Ise .............................. 419/31 |
| 5,943,666 | A | * | 8/1999 | Kleewein et al. ............... 707/2 |

(Continued)

*Primary Examiner*—Shahid A Alam
(74) *Attorney, Agent, or Firm*—Trop, Pruner & Hu; John D. Cowart; Steve McDonald

(57) ABSTRACT

A method and apparatus of analyzing a target system comprises receiving information relating to an environment of the target system and storing cost data based on the environment information. The plan and its estimated performance for a query may be determined based on the cost data. The environment information may pertain to the environment of a parallel system (e.g., a multi-node parallel system, a single-node parallel system having plural central processing units or a system running plural virtual processors) that is running a parallel database. The cost data may identify a number of nodes in the target system, a number of central processing units in each node of the target system, and other types of system information. The cost data may be stored in a relational table having a plurality of rows. Each row of the relational table may correspond to a different target system. The cost data is used to emulate the environment of the target system and is usable by an optimizer module to derive a query plan for an SQL (structured query language) query having the lowest (or lower) cost.

27 Claims, 6 Drawing Sheets

U.S. PATENT DOCUMENTS

| | | | |
|---|---|---|---|
| 6,067,542 A * | 5/2000 | Carino, Jr. | 707/4 |
| 6,208,955 B1 * | 3/2001 | Provan et al. | 703/20 |
| 6,223,171 B1 * | 4/2001 | Chaudhuri et al. | 707/2 |
| 6,289,334 B1 * | 9/2001 | Reiner et al. | 707/3 |
| 6,298,349 B1 * | 10/2001 | Toyoshima et al. | 707/100 |
| 6,381,604 B1 * | 4/2002 | Caughran et al. | 707/10 |
| 6,401,083 B1 * | 6/2002 | Agarwal et al. | 707/2 |
| 6,414,307 B1 * | 7/2002 | Gerlach et al. | 250/309 |
| 6,415,307 B2 * | 7/2002 | Jones et al. | 715/202 |
| 6,418,389 B2 * | 7/2002 | Peter et al. | 702/108 |
| 6,430,556 B1 * | 8/2002 | Goldberg et al. | 707/4 |
| 6,487,547 B1 * | 11/2002 | Ellison et al. | 707/2 |
| 6,507,834 B1 * | 1/2003 | Kabra et al. | 707/2 |
| 6,507,842 B1 * | 1/2003 | Grey et al. | 707/5 |
| 6,564,209 B1 * | 5/2003 | Dempski et al. | 707/3 |
| 6,615,120 B1 * | 9/2003 | Rother | 701/33 |
| 6,662,312 B1 * | 12/2003 | Keller et al. | 714/38 |
| 2003/0016237 A1 * | 1/2003 | Hickey | 345/700 |

\* cited by examiner

ANALYSIS METHOD AND APPARATUS FOR A PARALLEL SYSTEM

CROSS-REFERENCE TO RELATED APPLICATION

This application is a continuation of U.S. application Ser. No. 09/608,977, filed Jun. 30, 2000 titled "Analysis Method and Apparatus for a Parallel System," issued on May 18, 2004, as U.S. Pat. No. 6,738,756.

TECHNICAL FIELD

The invention relates to an analysis method and apparatus for a parallel system.

BACKGROUND

A substantial portion of the life cycle of software development is devoted to testing. The purpose of software testing is to detect errors in programs and, in the absence of errors, gain confidence in the proper functionality of the programs. A basic premise of software testing is that programs are adequately covered once the test cycle is complete. Thus, test cases must be properly selected so that some level of confidence is derived about the reliability of software from a sample set of test cases.

In testing software, particularly software in user systems that are relatively large, the test environment (often at the site of the software developer) is usually quite different from the actual operating environment. For example, in many data warehousing applications, the systems used to run the database management software are multi-node parallel processing systems having tens or even hundreds of nodes. The amount of data stored can be in the gigabyte to terabyte range. In addition, the configurations and architectures of the systems used by different users or customers usually differ.

One of the goals of a database management system is to optimize the performance of queries for access and manipulation of data stored in the database. Given a target environment, a plan is developed for each query to achieve better performance, sometimes referred to as selecting an access plan (query plan, join plan, or strategy) with the lowest cost (e.g., response time). The response time is the amount of time it takes to complete the execution of the query on a given system. The number of alternative access plans for a query grows at least exponentially with the number of relations participating in the query. A cost-based model can be used to compare different methods for doing a unit of work, with the most efficient method (or one of the more efficient methods) selected.

The performance of various access plans differ depending upon environmental factors relating to the hardware and software specifics of a target system (customer system). Differences in target systems usually cause the performance of query plans to differ significantly. One technique to emulate or simulate a target (customer) environment is by using expensive, custom hardware. However, such hardware-based test facilities are usually not cost effective.

A need thus exists for an improved method and apparatus to test target systems.

SUMMARY

In general, according to one embodiment, a method of analyzing query performance in a target system comprises receiving information relating to an environment of the target system and storing cost data based on the environment information. The performance estimate for a query is determined based on the cost data.

Other features and embodiments will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

In accordance with some embodiments, a target-level emulation feature allows emulation of a target system (user or customer system) by capturing environment information from the target system for purposes of testing, debugging, or other analysis. An extractor module in the target system extracts the desired target environment information and communicates the environment information to a test system. The captured target environment information, stored in and/or mapped to appropriate tables, files, and other storage locations in the test system, is accessible by an optimizer program. When executed, the optimizer program selects the lowest cost (or a lower cost) query plan in the target environment created by target-level emulation. By using the target-level emulation methods and apparatus according to some embodiments of the invention to generate query plans and estimated performances of the query plans, queries are tuned for better performance, the impact of environment changes on queries is better modeled, and the source of problems in a database environment is determined more efficiently. This is performed in a test or analysis system that is located at a location remote from the target system. Further, the test system can be a much smaller scale system than the target system, making testing more convenient and less expensive.

Figure 1:
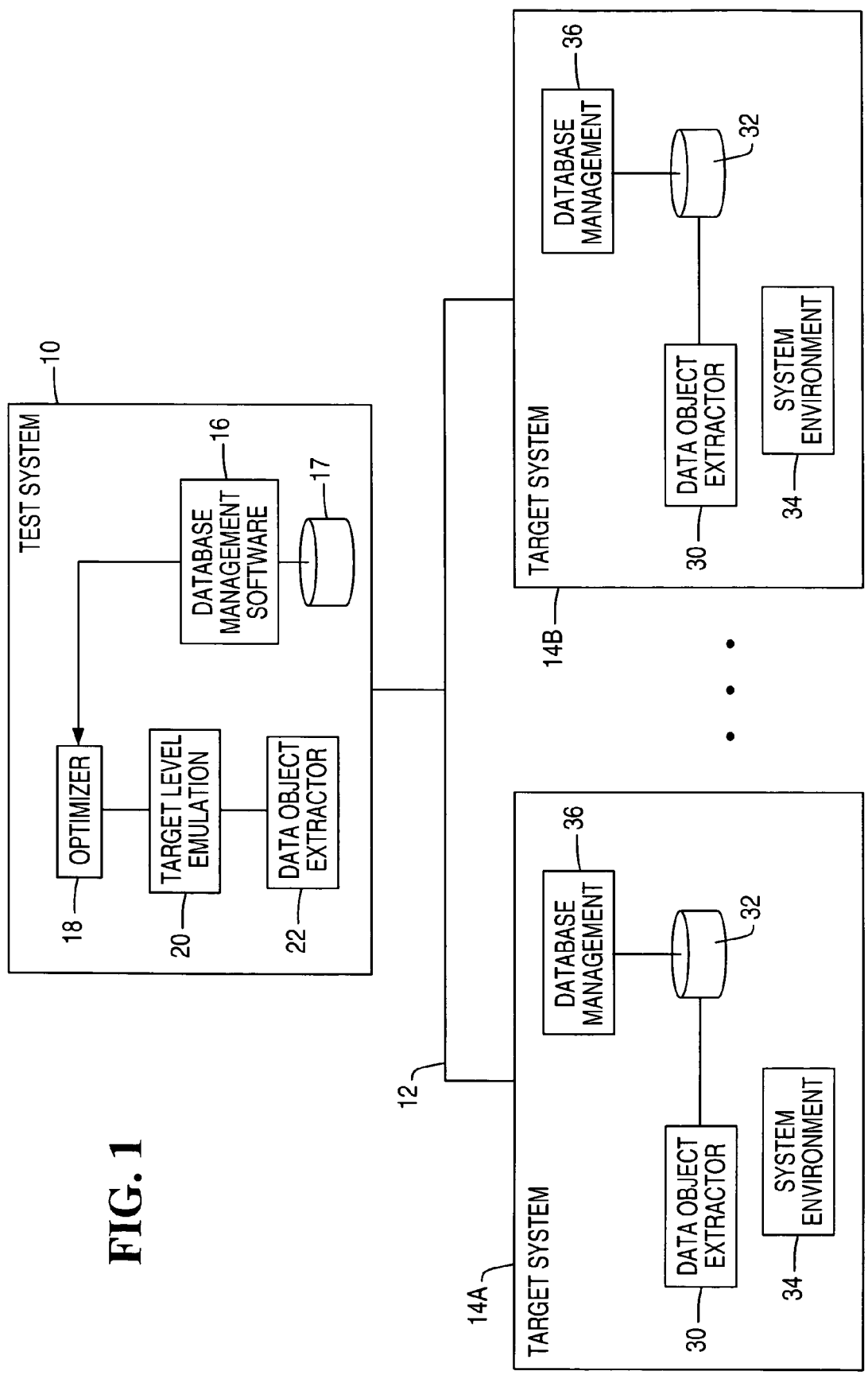
FIG. 1 is a block diagram showing interconnection of a test or analysis system to various target systems, in accordance with an embodiment.

Referring to FIG. 1, several target systems (14A, 14B) are illustrated. Each target system 14 represents a user or customer system on which software is executed. Thus, for example, the target system 14A is located at a first customer site, while the target system 14B is located at a second customer site. In one example application, the software running in each target system 14 includes database management software 36, e.g., data warehouse applications. In each target system 14, the database management software 36 manages access requests to a database 32. In accordance with some embodiments, the database 32 includes a parallel database distributed across plural nodes in each target system 14. Thus, each target system 14 can be a multi-node parallel processing system (sometimes referred to as a massively parallel system or MPP). Alternatively, the target system 14 is a single-node system having plural processors (sometimes referred to as a symmetric processing system or SMP).

Each target system 14 maintains a system environment 34, which is made up of system-specific information as well as database-level information of each target system. Thus, as used here, "environment information" of a target system refers to the system-specific information, database-level information, or any portion of the system-specific or database-level information. System-specific information includes such information as the number of nodes in the target system, the number of CPUs per node, the number of virtual processors in each node, and other system information. Database-level information includes statistics, data manipulation language (DML) statements, data definition language (DDL) statements, and the actual data of the database itself. Statistics include information on how data is structured in the database, the number of rows in a table, the data demographics of a table, and highest and lowest values of a column. Statistics may be sampled randomly from each node of a target system. DDL statements affect the structure of database objects, and may include statements such as SQL (Structured Query Language) ALTER statements (to redefine or alter databases, tables, indexes, etc.), CREATE statements (to create databases, indexes, tables, etc.), and so forth. DML statements are statements that manipulate data, such as the COMMIT statement (to make permanent all changes since the beginning of a transaction), DELETE statement (to remove rows from a table), INSERT statement (to add new rows to a table), SELECT statement (to perform a query by selecting rows and columns from one or more tables), UPDATE statement (to change data in a table), and so forth.

The test system 10 is coupled to the target systems 14A, 14B over a data network 12. The data network 12 may be a private network, or it may be a public network such as the Internet. For privacy in a public network, data exchanged between the test system 10 and one of the target systems 14A, 14B may be protected by a security protocol. Communications over the data network 12 can be according to various techniques, including electronic mail, file transfer, web browsing, and so forth.

To optimize queries in the test system 10 using an environment that emulates an actual target system, environment information is extracted in a target system and communicated over the network 12 to the test system 10. Each target system 14 includes a data object extractor 30 to extract desired environment information. The data object extractor 30 captures system-specific information (also referred to as cost-related information) and database-level information from the corresponding target system 14 and communicates the captured environment information over the data network 12 to the test system 10. The data object extractor 30 in each target system 14 cooperates with a data object extractor 22 running in the test system 10. The communication of the extracted data may be performed in a number of different ways, e.g., sent by electronic mail, sent by file transfer, downloaded from a web site, and so forth.

In some embodiments, the data object extraction process occurs in two phases. First, the data object extractor 30 in the target system 14 dumps target environment information (including cost-related information, statistics, DDL statements, DML statements, actual database data) from each target system 14 to the test system 10. After the target environment information is copied from the data object extractor 30 to the test system 10, a second process, referred to as an "apply process," is performed in which the data received from the target system 14 is loaded and/or mapped into appropriate tables or system files in the test system 10. The target environment information that has been loaded into the test system 10 is referred to as target-level emulation data 20. The loading and applying process is performed by the data object extractor 22 running inside the test system 10 (in cooperation with the data object extractor 30 in each target system 14).

The test system 10 further includes an optimizer module 18 for optimizing queries to a database 17 managed by a database management software 16 running in the test system 10. For more accurate performance determinations, the optimizer module 18 uses target-level emulation data 20 that has been communicated from a target system 14 to the test system 10. Based on the target-level emulation data 20, the optimizer module 18 selects the most efficient query plan (or one of the more efficient query plans) for a given query in the test system 10. Hooks in the optimizer module 18 enables the optimizer module 18 to access information stored in databases and tables containing the target-level emulation data 20.

In addition to more accurate performance of the optimizer module 18, target-level emulation like that described here also allows systems less sophisticated than the target parallel systems to accurately emulate query plan generation (and associated cost estimates) for target parallel systems. In fact, many test systems 10 are as simple as laptop computers loaded with the appropriate software, including the data object extractor 22, the optimizer module 18, the database management software 16, and the database 17. Consequently, using the target-level emulation feature in accordance with some embodiments, a more convenient, flexible, and cost effective test method and apparatus is provided to more accurately test query plan generation of database management software running in target systems.

For a given query, the optimizer module 18 in a parallel relational database system identifies an access plan (query plan, join plan, or strategy) that will reduce the response time of the query. The response time is the amount of time it takes to complete the execution of the query on the given target parallel system. One technique of query optimization uses a cost model to estimate the response time of a given query plan and to search the space of query plans to return a plan with a low cost. In the cost-based optimization model, different methods for doing a unit of work is compared and the most efficient method is selected (the plan with the lowest cost). Because the number of alternatives may be quite large, especially in a parallel system with a large number of nodes running a large relational database, the query optimizer module 18 uses statistics and/or sampling techniques to reduce the search space in optimizing queries.

Figure 2:
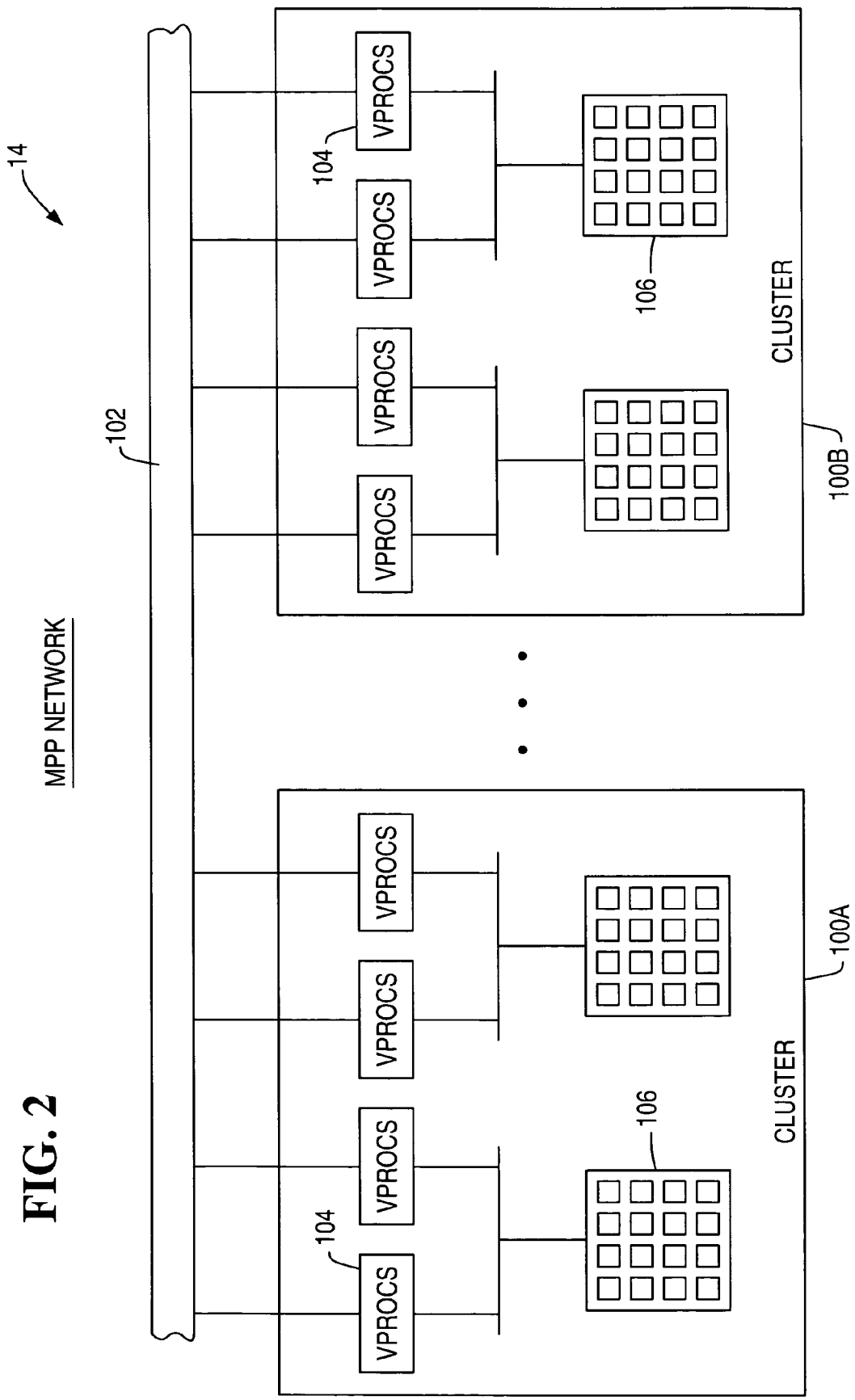
FIG. 2 is a block diagram of an example target system.

Referring to FIG. 2, an example arrangement of a target multi-node parallel system 14 is illustrated. The target system 14 has plural nodes 100A, 100B, and so forth, coupled by an interconnect network 102. Each node may include a single central processing unit (CPU) or multiple CPUs. Nodes that are responsible for managing portions of a parallel relational database are referred to as access module processors (AMPs). These are distinguished from other types of nodes that may provide user interface tasks, which are referred to as interface processors (IFPs), which are not illustrated in FIG. 2.

In addition, as illustrated in FIG. 2, each node 100 (or AMP) includes multiple virtual processors (VPROCs) 104 to more efficiently handle access requests to storage devices 106. Each VPROC 104 may be responsible for a logical disk space, referred to as a virtual disk, which may include one or more storage devices 106. The combination of the storage devices 106 may be referred to as a cluster. The concept of VPROCs and virtual disks enable a larger amount of parallelism in the parallel system 14. Examples of VPROCs include parsing engines (PEs) and virtual access module processors (VAMPs). More than one PE or VAMP can run in each node.

In further embodiments, plural VPROCs, such as PEs and VAMPs, are also executable in a single-node multiprocessing system, such as an SMP system. In the single-node system, plural VPROCs can be distributed across plural CPUs. In another arrangement, plural VPROCs can be running on a single-node system having a single CPU. As used here, a "parallel system" refers to a multi-node parallel processing system, a single-node multiprocessing system with multiple CPUs, or a single-node system with a single CPU running multiple virtual processors.

Figure 3:
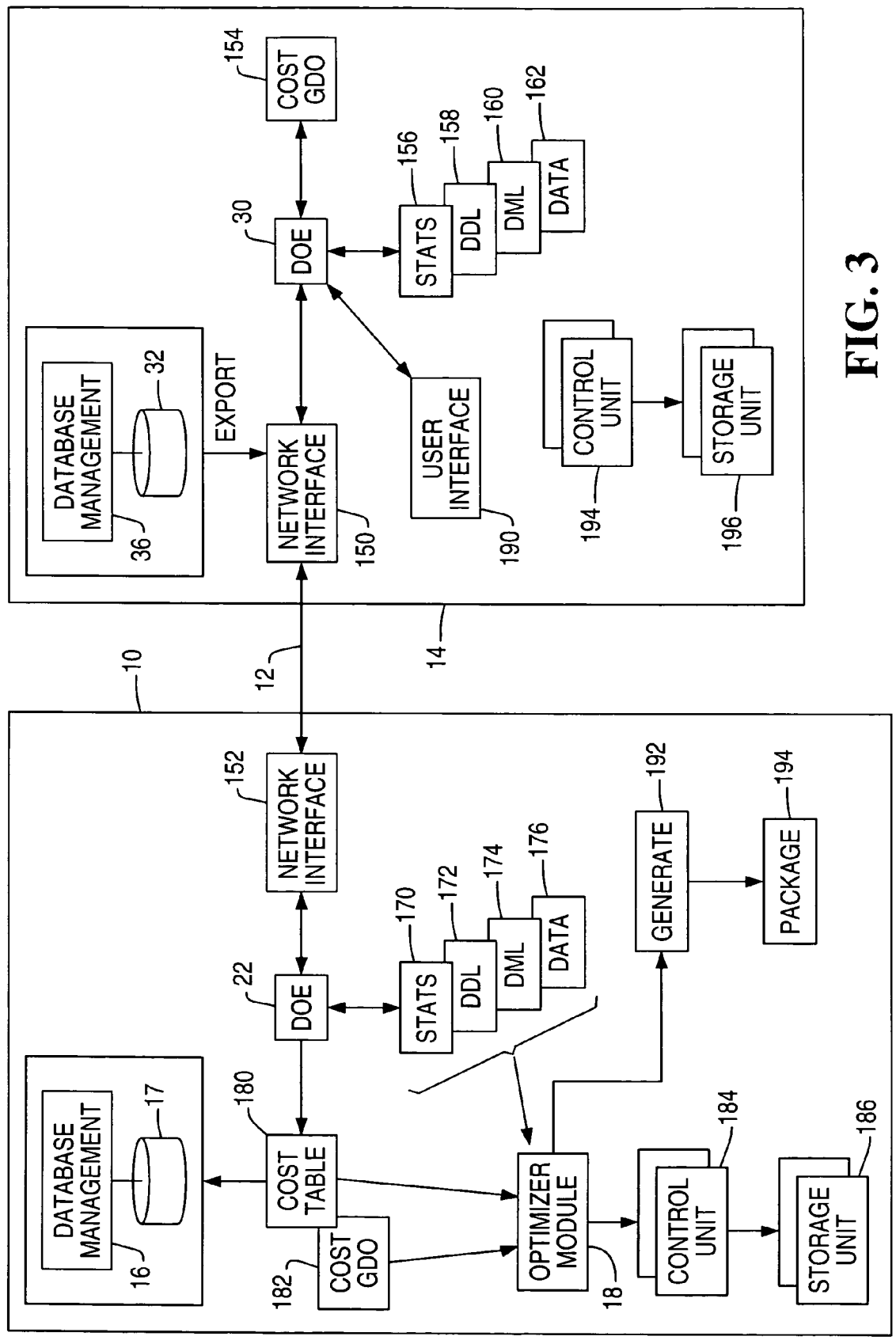
FIG. 3 is a block diagram of components of a test system and a target system, in accordance with an embodiment.

Referring to FIG. 3, components of the target system 14 and the test system 10 are illustrated in greater detail. As discussed above, the target system 14 contains various database-level information, including statistics 156, DDL statements 158, DML statements 160, and actual data 162 associated with the database 32. In addition, cost-related information may be contained in configuration files 154. In one embodiment, the configuration files 154 are referred to as cost global distributed objects (GDO).

Figure 4:
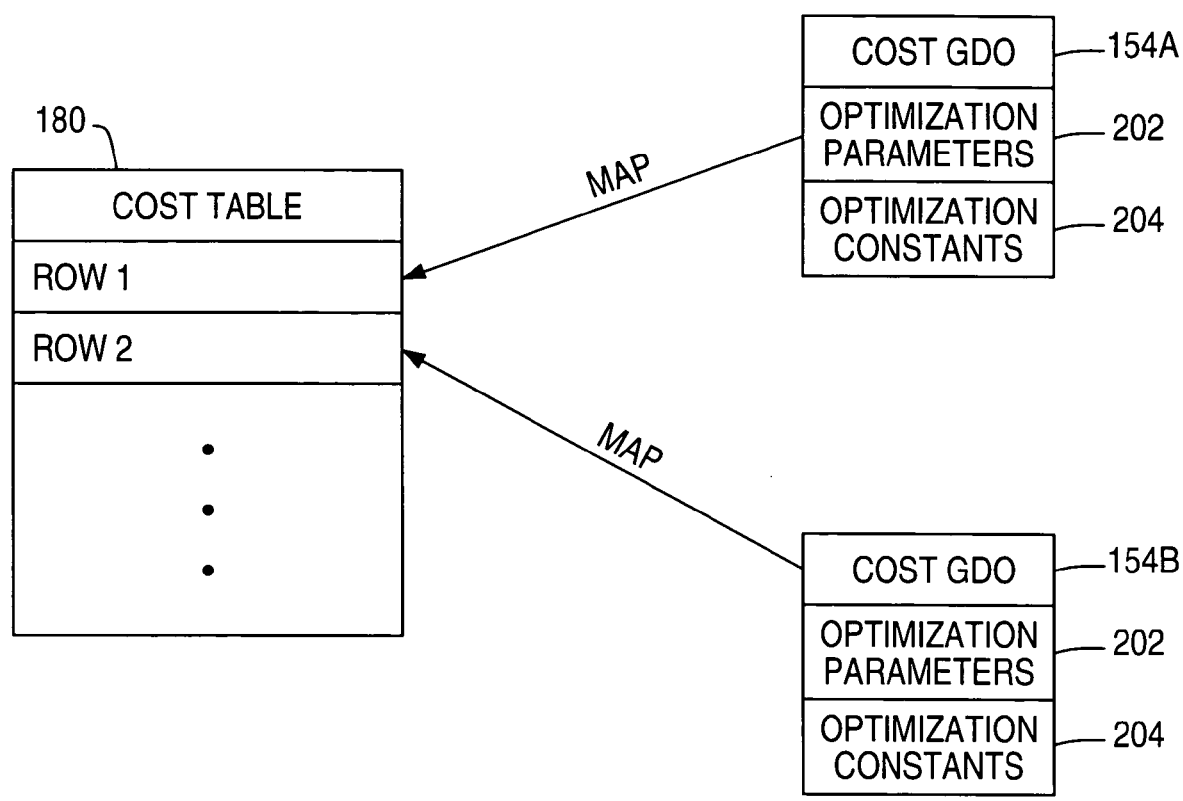
FIG. 4 illustrates configuration data and a cost table stored in respective target systems and the test system of FIG. 3.

As further shown in FIG. 4, the cost GDO 154 contains cost parameters 202 and cost constants 204 that may affect performance of various queries. FIG. 4 shows two cost GDOs 154A and 154B associated with respective target systems 14A and 14B. The cost parameters 202 include, as examples, the number of nodes of the corresponding system, the number of CPUs per node, the number of VPROCs per node, the amount of memory per VPROC, MIPS (millions of instructions per second) per CPU, disk array access speeds, disk access speeds, and network access speeds.

In addition to the optimization parameters 202, performance optimization constants 204 are also contained in the cost GDO 154. Performance optimization constants specify transfer rates for each kind of storage media and network interconnect in the target system. The target system 14 determines the values for the performance optimization constants at start-up and puts the appropriate sets of values into section 204 in the control GDO 154. Thus, for example, performance optimization constants may be specified for different types of disk arrays, such as disk arrays from different manufacturers or of different models. Although the illustrated embodiment shows the optimization parameters and optimization constants as separate components, the distinction may be removed in further embodiments.

To export or extract target information, the data object extractor 30 provides a user interface 190 through which a user may select desired information to export or dump into the test system 10. The user interface 190 may, for example, provide command lines, graphical user interface icons, and so forth to access the desired information in the target system 14. For example, the cost parameters 202 and performance optimization constants 204 may be extracted into one or more files (such as in binary format or in some other format) for communication through network interfaces 150 and 152 in respective systems 14 and 10 over the network 12. Desired statistics 156, DDL statements 158, DML statements 160, and user data 162 may also be extracted and communicated across the network 12 to the test system 10.

Figure 5:
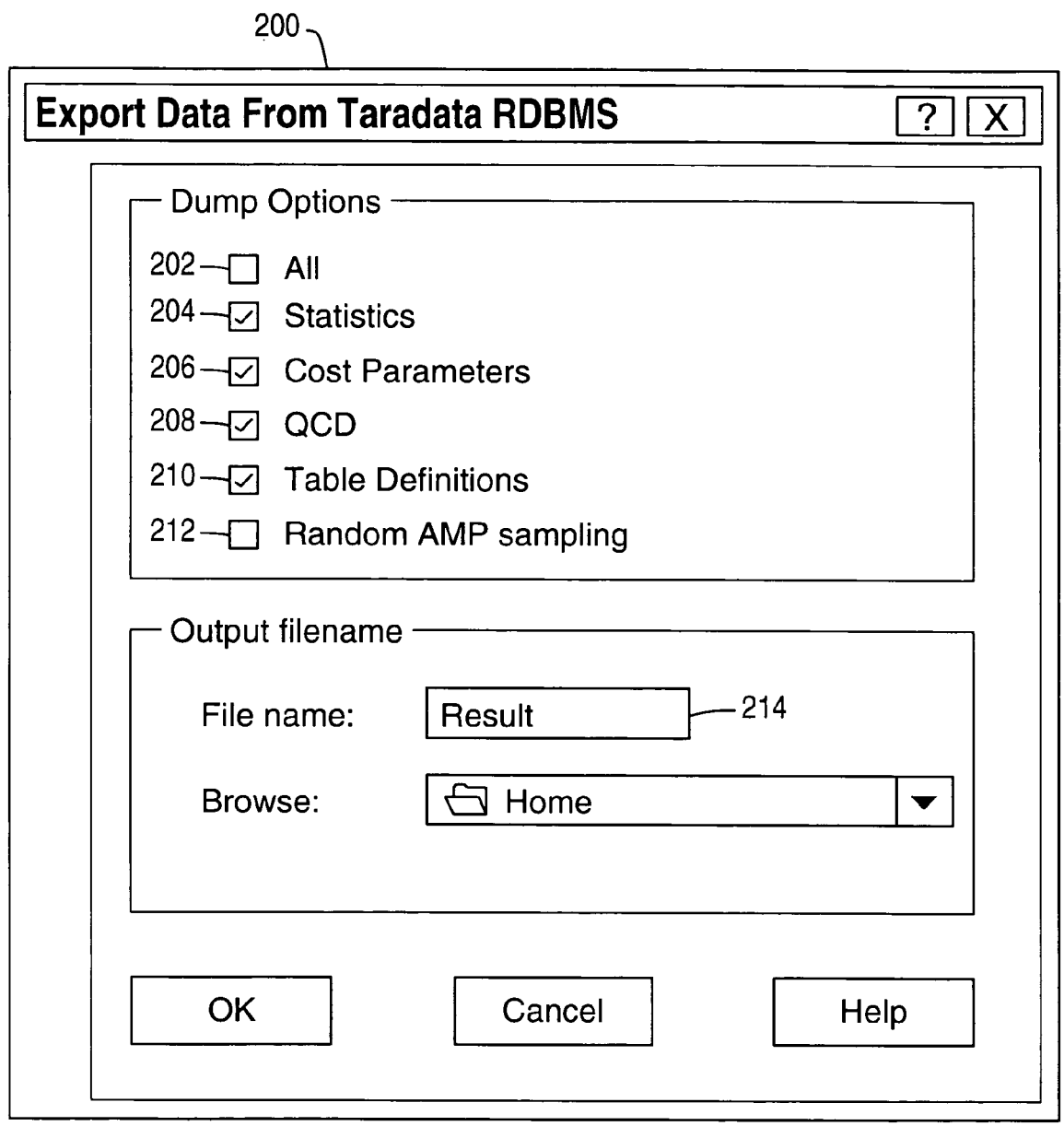
FIG. 5 illustrates an Export Data window to capture selected environment information of a target system, in accordance with an embodiment.

Referring further to FIG. 5, an Export Data window 200 that is part of the user interface 190 is illustrated. The Export Data window 200 allows the user to select the desired types of data to capture. One option is an "ALL" option 202, which causes the data object extractor 30 in the target system 14 to capture all selectable types of environment information. Alternatively, individual types of environment information may be selected by selecting a "STATISTICS" option 204 (to capture statistics data), a "COST PARAMETERS" option 206 (to capture cost-related information), a "QCD" option 208 (to capture query capture database information, which are databases that contain query information), a "TABLE DEFINITIONS" option 210 (to capture DML and DDL statements), and a "RANDOM AMP SAMPLING" option 212 (to capture random AMP samples). A file name 214 can be selected to identify the file to which the captured information is dumped.

Referring again to FIG. 3, the extracted information received from the target system 14 (e.g., by electronic mail, file transfer, web download, etc.) is applied to appropriate locations in the test system 10 (e.g., relational tables, files, and other locations). For example, the extracted statistics, DDL statements, DML statements, and user data may be stored in locations 170, 172, 174, and 176, respectively, by the data object extractor 22 running in the test system 10.

In addition, by use of a diagnostic query statement, the data object extractor 22 maps the extracted cost information into a cost table 180, which is a relational table. In one embodiment, the diagnostic query statement, which is a SQL statement, includes a diagnostic Dump Costs statement. The diagnostic Dump Costs statement dumps the extracted cost information into rows of the cost table 180. Each row may correspond to one target system 14, as illustrated in FIG. 4. Thus, multiple rows of the cost table 180 correspond to multiple target systems 14. The Dump Costs statement specifies a target system name, which is a unique primary key entry into the cost table 180. The target system name identifies a row in the cost table 180.

Another SQL diagnostic query statement is a diagnostic Set Costs statement, which directs the optimizer module 18 in the test system 10 to use the environmental cost parameters as defined in the cost table 180 when performing optimization tasks. The Set Costs statement can also specify at which level optimization is to be performed. In one embodiment, separate levels are defined, including a Request level, a Session level, an IFP (interface processor) level, and a System level. When the Request level is selected, the optimizer module 18 is directed to use the appropriate values of the cost table 180 for the current request. When the Session level is selected, the optimizer module 18 is directed to use appropriate entries of the cost table 180 for the current user session. A system has multiple sessions, with one session assigned to each user of the system. In a session, multiple requests can be issued. When the IFP level is selected, the optimizer module 18 is directed to use the cost table 180 for the current IFP. When the system level is selected, the optimizer module 18 is directed to access a row of the cost table 180 to create a cost GDO 182. Effectively, at the system level, the cost information transferred from the target system 14 is used by the optimizer module 18 for the entire system, for all IFPs, for all sessions, and for all requests. Different entries (or combinations of entries) in the columns of a given row of the cost table 180 are used depending on which level is selected.

Figure 6:
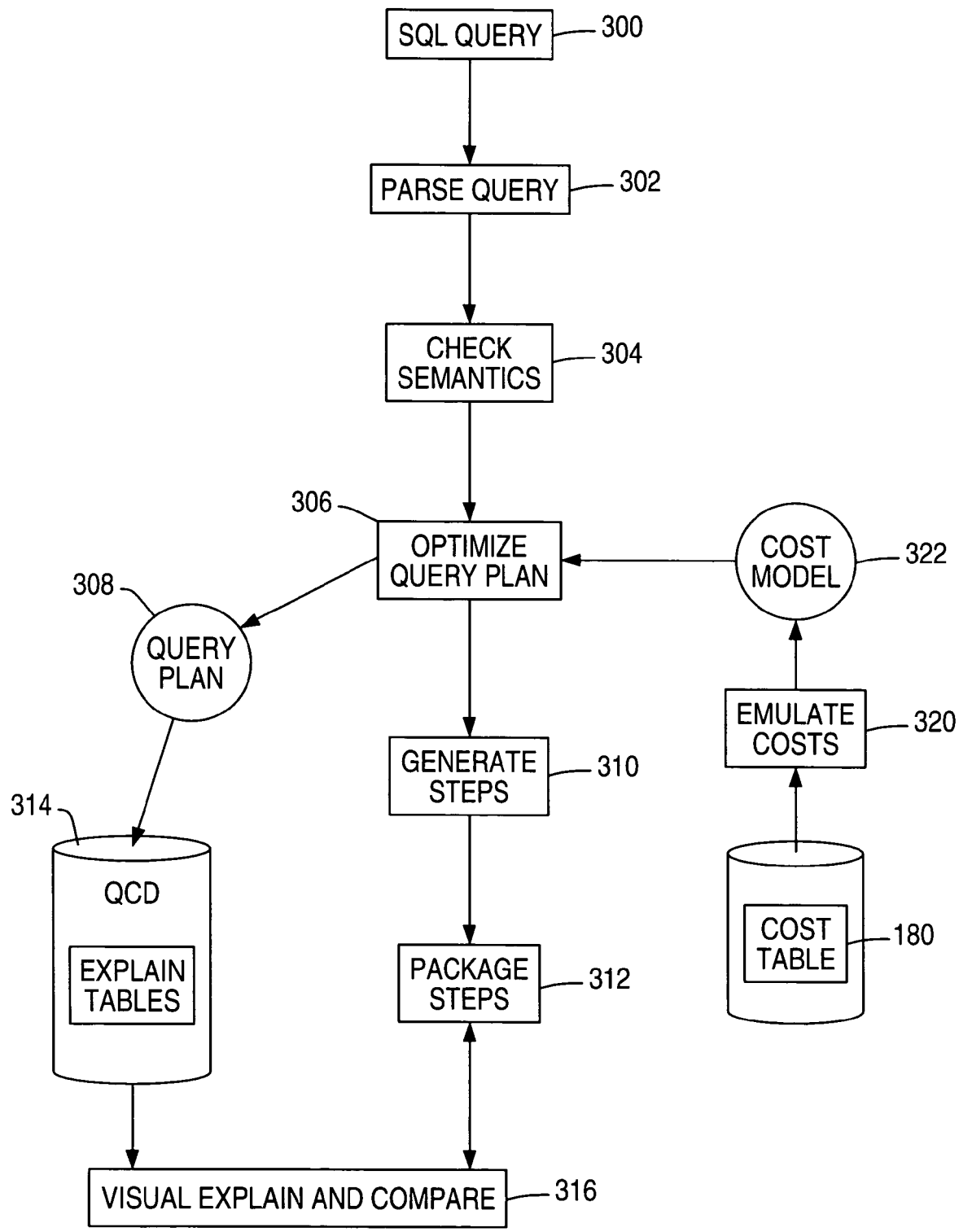
FIG. 6 illustrates optimization of a query in accordance with an embodiment.

Referring to FIG. 6, with target-level emulation turned on (or activated) by the diagnostic Set Costs statement, optimization of queries can begin. Using contents of the cost table 180, the test system 10 emulates (at 320) the selected target environment (as selected by the Set Costs statement). The emulation provides a cost model 322 from which the optimizer module 18 performs its optimization tasks.

An SQL request 300 is received by a parser 302, with the query parsed (at 302) and the semantics of the query checked (at 304). The query is issued by a user (e.g., a developer testing performance of the query) through a user interface in the test system 10. The query may be one that has been identified by a customer as causing problems or having unsatisfactory performance when running in a target system 14.

The parsed query is then forwarded to the optimizer module 18, where the query is optimized (at 306) to identify the most efficient (or lowest cost) access plan given the emulated costs. A generator 304 is then used to generate steps associated with processing of a query, and a packaging module 194 is used to create a linear set of steps.

A query plan 308 generated by the optimizer module 18 for a given query is also inserted into Explain tables in a QCD 314. This can be performed by using the SQL Explain Plan statement or an SQL Insert statement. The query plans are displayable by a visual explain and compare tool 316, which a user can use to analyze a query plan produced by the optimizer module 18. The visual explain and compare tool 316 enables a user to view the execution or query plan followed to execute a specified SQL statement. By storing multiple plans in the QCD 314, a user can also view and compare Explain data from different releases (referred to as regression analysis).

By analyzing the plan generated for the query and its expected peformance, the user can identify sources of problems. In addition, by changing (at 324) entries in the cost table 180, the user can tune the query for optimal performance. Based on this analysis, the user can suggest changes in the customer platform to improve performance of their parallel database.

The optimizer module 18 includes cost functions that are called to perform optimization tasks. The cost functions are used to determine costs based on the environment attributes, which have been downloaded from the target system 14. For example, the cost functions may include a FindNumBlocks function, which calculates the number of blocks in a relation. Another function is the DiskCost function, which calculates the cost of disk operation. A VAMPsPerCPU function returns the number of VAMPs or VPROCs for an operation. A VAMPsPerPMA function 214 returns the number of VAMPs or VPROCs for each node. An OptRDup function 216 computes the cost of a row duplication. Various other cost functions also exist in the test system 10 that can be called by the optimizer module 18.

Some contents of each row of the cost table 180 are described below. A field TARGET_SYS_NAME is a unique primary value (unique primary key) to identify the target system. This primary key is used by the diagnostic Set Costs statement to identify the row from the cost table 180 that the optimizer module 18 is to use. Another entry of the cost table 18 identifies the type of the target system. Another parameter, OptAmpCnt specifies the number of nodes in the target system, and a parameter IFPCnt specifies the number of IFPs in the system. An OptSysCPUWeight field defines the system assigned weight to the CPU contribution for the optimization of a request. A field OptSysDiskWeight defines the system assigned weight to the disk contribution for the optimization of a request. A parameter OptSysNetWeight defines the system assigned weight to the network contribution for the optimization of a request. A parameter OptRowAccessCost field defines the cost of accessing a row in memory. A parameter OptOutputRowCost field defines the overhead cost for building an output row. A field OptRedistributeCost defines the cost of redistributing a row.

In addition, a field OptCPUsPerPMA defines a number of CPUs in a processor module assembly (PMA), or node. A field OptVampsPerPMA defines the number of virtual processors (VPROCs) in a node. A field OptVampsPerCPU defines the number of VPROCs per CPU. A field OptPMAsPerDiskArray defines the number of nodes connected to a disk array. Numerous other entries may be defined in the cost table 18.

The various entries listed above are provided for purposes of illustration only, and are not intended to limit the scope of the invention. The types of entries that are contained in the cost table 180 is implementation-specific, and depends on how the optimizer module 18 is designed. Different types of optimizer modules may utilize different types of cost information, and thus the cost entries in the cost table 18 may vary in different embodiments. All factors needed by the optimizer to generate a plan as if the optimizer was running on the target system are available to and used by the optimizer in the test system.

The various software modules or routines discussed herein, such as the optimizer module 18, the data object extractor 22 and 30, and other software modules or routines may be executable on corresponding control units. For example, as shown in FIG. 3, software modules or routines may be executable on one or more control units 184. Instructions and data associated with the software modules or routines may be stored in one or more storage units 186. Similarly, software modules or routines may be executable on one or more control units 194 in the target system 14. Instructions and data associated with the software modules or routines may be stored in one or more storage units 196. Each control unit may include a microprocessor, a microcontroller, a processor card (including one or more microprocessors or microcontrollers), or other control or computing devices. As used here, a "controller" can refer to either hardware or software or a combination of both.

Each storage unit includes one or more machine-readable storage media for storing data and instructions. The storage media includes different forms of memory including semiconductor memory devices, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tapes; an optical media such as compact disks (CDs) or digital video disks (DVDs). Instructions that make up the various software layers, routines or modules in the various systems or nodes may be stored in the respective storage units. The instructions, when executed by a respective control unit, calls the corresponding system to perform programmed acts.

The instructions of the software layers, routines or modules may be transported to a system in one of many different ways. For example, code segments including instructions stored on floppy disks, CD or DVD media, a hard disk, or transported through a network interface card, modem, or other interface device may be loaded into the system and executed as corresponding software layers, routines, or modules. In the loading or transport process, data signals that are embodied in carrier waves (transmitted over telephone lines, network lines, wireline links, cables, and the like), may communicate the code segments, including instructions, to the network element. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of using a test system to plan the execution of a query in a target system, comprising:
   receiving by the test system environment information that indicates how the target system is configured, wherein the test system is configured to emulate respective performances of multiple query-execution options of the target system;
   storing cost data that indicates, for each of the multiple query-execution options, the cost in computing resources associated with choosing that option in the target system;
   defining one or more diagnostic SQL statements comprising a diagnostic Set Costs statement to direct the test system to use an identified portion of the cost data to activate use of the cost data; and
   using the environment information and the cost data in determining a most efficient query plan for execution by the target system.

2. The method of claim 1, further comprising determining an estimated performance of the query plan.

3. The method of claim 1, wherein receiving the environment information comprises receiving environment information of a multi-node parallel processing system.

4. The method of claim 1, wherein receiving the environment information comprises receiving environment information of a system on which plural virtual processors for handling access to data are run.

5. The method of claim 1, wherein receiving the environment information comprises receiving environment information of a parallel system running a parallel database, and wherein determining the query plan is further based on environment information related to the parallel database.

6. The method of claim 1, wherein determining the query plan comprises determining a query plan for the query, by an optimizer module, using the cost data.

7. The method of claim 1, wherein storing the environment information comprises storing data identifying a number of nodes in the target system.

8. The method of claim 7, wherein storing the environment information comprises storing data identifying a number of central processing units in each node of the target system.

9. The method of claim 1, wherein storing the cost data comprises storing the cost data into a relational table.

10. The method of claim 9, wherein plural target systems are capable of being analyzed, and wherein storing the cost data in the relational table comprises storing the cost data of each target system in a different row of the relational table.

11. The method of claim 10, further comprising activating an emulation feature and identifying one of the rows of the relational table to employ.

12. The method of claim 1, further comprising activating an emulation feature and setting one of plural levels for performing the emulation.

13. The method of claim 12, wherein setting one of the plural levels comprises setting one of a request level, a session level, an interface processor level, and a system level.

14. The method of claim 1, wherein defining the one or more diagnostic SQL statements comprises defining a diagnostic Dump Costs statement to dump cost data, based on environment information of the target system, into a test system.

15. The method of claim 1, further comprising storing cost data based on environment information of plural target systems.

16. The method of claim 1, wherein receiving the environment information comprises receiving cost-based information.

17. The method of claim 1, wherein the target system runs a parallel database, and wherein receiving the environment information comprises receiving information related to the database.

18. The method of claim 17, wherein receiving the environment information comprises receiving one or more of statistics information, data manipulation language statements, and data definition language statements.

19. The method of claim 18, wherein the target system comprises multiple nodes, and wherein receiving the environment information comprises receiving random samples of each node.

20. A software module for execution by a test system for use in planning the execution of a query in a target system, the software module comprising instructions embodied on a computer-readable media that, when executed, cause:
   an interface to receive environment information that indicates how the target system is configured;
   a storage device to store cost data that indicates, for each of multiple query-execution options, the cost in computing resources associated with choosing that option in the target system;
   a controller to dump the cost data into the test system in response to a first diagnostic SQL statement; and
   an optimizer module to determine a most efficient access plan for execution of the query by the target system based on emulation of each of the multiple query-execution options on the target system using the environment information and the cost data.

21. The software module of claim 20, wherein the interface comprises an interface to a data network coupled to the target system.

22. The software module of claim 20, wherein the storage device comprises a relational table containing plural rows, one of the rows containing cost data associated with the target system.

23. The software module of claim 22, wherein another one of the rows contains cost data associated with another target system.

24. The software module of claim 20, wherein the environment information comprises parameters indicating a system arrangement of the target system.

25. The software module of claim 24, wherein the environment information comprises a parameter identifying a number of nodes in the target system.

26. The software module of claim 25, wherein the environment information comprises a parameter identifying a number of central processing units in each node.

27. The software module of claim 20, further comprising a controller to identify a portion of the cost data to be used by the optimizer module in response to a second diagnostic statement.

* * * * *